(12) United States Patent
Bains et al.

(10) Patent No.: US 7,404,055 B2
(45) Date of Patent: Jul. 22, 2008

(54) MEMORY TRANSFER WITH EARLY ACCESS TO CRITICAL PORTION

(75) Inventors: Kuljit Bains, Olympia, WA (US); John Halbert, Beaverton, OR (US); Greg Lemos, Folsom, CA (US); Randy Osborne, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 200 days.

(21) Appl. No.: 11/392,471

(22) Filed: Mar. 28, 2006

(65) Prior Publication Data

US 2007/0244948 A1    Oct. 18, 2007

(51) Int. Cl.
*G06F 12/00* (2006.01)

(52) U.S. Cl. .................. 711/165; 711/209; 711/212; 711/217

(58) Field of Classification Search .............. 711/165, 711/209, 212, 217
See application file for complete search history.

(56) References Cited

U.S. PATENT DOCUMENTS

| | | |
|---|---|---|
| 5,742,840 A | 4/1998 | Hansen et al. |
| 5,748,872 A | 5/1998 | Norman |
| 5,860,080 A | 1/1999 | James et al. |
| 5,867,422 A | 2/1999 | John |
| 5,898,863 A | 4/1999 | Ofer et al. |
| 6,006,318 A | 12/1999 | Hansen et al. |
| 6,029,186 A | 2/2000 | DesJardins et al. |
| 6,034,878 A | 3/2000 | Osaka et al. |
| 6,038,682 A | 3/2000 | Norman |
| 6,092,229 A | 7/2000 | Boyle et al. |
| 6,125,419 A | 9/2000 | Umemura et al. |
| 6,128,750 A | 10/2000 | Espy et al. |
| 6,151,648 A | 11/2000 | Haq |
| 6,154,826 A | 11/2000 | Wulf et al. |
| 6,154,855 A | 11/2000 | Norman |
| 6,160,423 A | 12/2000 | Haq |
| 6,185,644 B1 | 2/2001 | Farmwald et al. |
| 6,255,859 B1 | 7/2001 | Haq |
| 6,263,413 B1 | 7/2001 | Motomura et al. |

(Continued)

FOREIGN PATENT DOCUMENTS

WO    WO 99/30240    6/1999

(Continued)

OTHER PUBLICATIONS

U.S. Appl. No. 10/454,399, filed Jun. 3, 2003, Pete D. Vogt.

(Continued)

*Primary Examiner*—Reginald G. Bragdon
*Assistant Examiner*—Mehdi Namazi
(74) *Attorney, Agent, or Firm*—Marger Johnson & McCollom, PC

(57) ABSTRACT

In some embodiments, data may be transferred from a first memory agent to a second memory agent in a first format having a first width, and at least a critical portion of the data maybe transferred from the second memory agent back to the first memory agent in a second format having a second width, where the critical portion is included in a first frame. The critical portion may include a cacheline mapped over a memory device rank. Other embodiments are described and claimed.

26 Claims, 8 Drawing Sheets

U.S. PATENT DOCUMENTS

| | | | |
|---|---|---|---|
| 6,317,352 | B1 | 11/2001 | Halbert et al. |
| 6,327,205 | B1 | 12/2001 | Haq |
| 6,345,321 | B1 | 2/2002 | Litaize et al. |
| 6,369,605 | B1 | 4/2002 | Bonella et al. |
| 6,408,402 | B1 | 6/2002 | Norman |
| 6,449,213 | B1 | 9/2002 | Dodd et al. |
| 6,487,102 | B1 | 11/2002 | Halbert et al. |
| 6,493,250 | B2 | 12/2002 | Halbert et al. |
| 6,502,161 | B1 | 12/2002 | Perego et al. |
| 6,513,080 | B1 | 1/2003 | Haq |
| 6,625,687 | B1 | 9/2003 | Halbert et al. |
| 6,643,752 | B1 | 11/2003 | Donnelly et al. |

FOREIGN PATENT DOCUMENTS

| | | |
|---|---|---|
| WO | WO 99/41666 | 8/1999 |
| WO | WO 99/41667 | 8/1999 |

OTHER PUBLICATIONS

U.S. Appl. No. 10/454,400, filed Jun. 3, 2003, Pete D. Vogt and James W. Alexander.
U.S. Appl. No. 10/454,398, filed Jun. 3, 2003, Pete D. Vogt.
U.S. Appl. No. 10/456,206, filed Jun. 4, 2003, Pete D. Vogt.
U.S. Appl. No. 10/456,178, filed Jun. 4, 2003, Pete D. Vogt.
U.S. Appl. No. 10/456,174, filed Jun. 4, 2003, Pete D. Vogt.
U.S. Appl. No. 10/713,868, filed Nov. 14, 2003, Pete D. Vogt.
U.S. Appl. No. 10/714,026, filed Nov. 14, 2003, Pete D. Vogt.
U.S. Appl. No. 10/714,025, filed Nov. 14, 2003, Pete D. Vogt.
U.S. Appl. No. 10/883,474, filed Jun. 30, 2004, Pete D. Vogt.
U.S. Appl. No. 10/882,999, filed Jun. 30, 2004, Pete D. Vogt.
U.S. Appl. No. 10/859,438, filed May 31, 2004, Pete D. Vogt.
U.S. Appl. No. 10/858,850 filed May 31, 2004, Pete D. Vogt.
U.S. Appl. No. 10/859,060, filed May 31, 2004, Pete D. Vogt.
The Institute of Electrical Engineers, Inc., IEEE Standard for Scalable Coherent Interface (SCI), May 23, 2001, 1-243 pp.
R. Ng (Sun Microsystems, Inc.), Fast Computer Memories, IEEE Spectrum, Oct. 1992, pp. 36-39.
R.H.W. Salters (Philips Research Laboratories), Fast DRAMs for Sharper TV, IEEE Spectrum, Oct. 1992, pp. 40-42.
F. Jones (United Memories, Inc.), A New Era of Fast Dynamic RAMs, IEEE Spectrum, Oct. 1992, pp. 43-49.
M. Farmwald and D. Mooring (Rambus, Inc.), A Fast Path to One Memory, IEEE Spectrum, Oct. 1992, p. 50-51.
S. Gjessing (University of Oslo), D.B. Gustavson (Stanford Linear Accelerator Center), D.V. James and G. Stone (Apple Computer, Inc.) and H. Wigger (Hewlett-Packard Co.), A RAM Link for High Speed, IEEE Spectrum, Oct. 1992, pp. 52-53.

FRAME 0
UNIT INTERVAL

|      | 0   | 1   | 2   | 3   | 4   | 5   | 6   | 7   | 8    |
|------|-----|-----|-----|-----|-----|-----|-----|-----|------|
| RDQ0 | d0  | d4  | d8  | d12 | d16 | d20 | d24 | d28 | CRC8 |
| RDQ1 | d1  | d5  | d9  | d13 | d17 | d21 | d25 | d29 | CRC8 |
| RDQ2 | d2  | d6  | d10 | d14 | d18 | d22 | d26 | d30 | CRC8 |
| RDQ3 | d3  | d7  | d11 | d15 | d19 | d23 | d27 | d31 | CRC8 |
| RDQ4 | d32 | d36 | d40 | d44 | d48 | d52 | d56 | d60 | CRC8 |
| RDQ5 | d33 | d37 | d41 | d45 | d49 | d53 | d57 | d61 | CRC8 |
| RDQ6 | d34 | d38 | d42 | d46 | d50 | d54 | d58 | d62 | CRC8 |
| RDQ7 | d35 | d39 | d43 | d47 | d51 | d55 | d59 | d63 | CRC8 |

FRAME 1
UNIT INTERVAL

|      | 9   | 10   | 11   | 12   | 13   | 14   | 15   | 16   | 17   |
|------|-----|------|------|------|------|------|------|------|------|
| RDQ0 | d64 | d68  | d72  | d76  | d80  | d84  | d88  | d92  | CRC8 |
| RDQ1 | d65 | d69  | d73  | d77  | d81  | d85  | d89  | d93  | CRC8 |
| RDQ2 | d66 | d70  | d74  | d78  | d82  | d86  | d90  | d94  | CRC8 |
| RDQ3 | d67 | d71  | d75  | d79  | d83  | d87  | d91  | d95  | CRC8 |
| RDQ4 | d96 | d100 | d104 | d108 | d112 | d116 | d120 | d124 | CRC8 |
| RDQ5 | d97 | d101 | d105 | d109 | d113 | d117 | d121 | d125 | CRC8 |
| RDQ6 | d98 | d102 | d106 | d110 | d114 | d118 | d122 | d126 | CRC8 |
| RDQ7 | d99 | d103 | d107 | d111 | d115 | d119 | d123 | d127 | CRC8 |

FIG.4

FRAME 0
UNIT INTERVAL

| | 0 | 1 | 2 | 3 | 4 | 5 | 6 | 7 | 8 |
|---|---|---|---|---|---|---|---|---|---|
| WDQ0 | WD=1 | d1 | d4 | d7 | d10 | d13 | d16 | CRC | CRC |
| WDQ1 | d0 | d2 | d5 | d8 | d11 | d14 | d17 | d19 | CRC |
| WDQ2 | s0 | d3 | d6 | d9 | d12 | d15 | d18 | d20 | CRC |
| WDQ3 | s1 | d33 | d36 | d39 | d42 | d45 | d48 | CRC | CRC |
| WDQ4 |  | d34 | d37 | d40 | d43 | d46 | d49 | d51 | CRC |
| WDQ5 | d32 | d35 | d38 | d41 | d44 | d47 | d50 | d52 | CRC |

FRAME 1
UNIT INTERVAL

| | 9 | 10 | 11 | 12 | 13 | 14 | 15 | 16 | 17 |
|---|---|---|---|---|---|---|---|---|---|
| WDQ0 | WD=1 | d22 | d25 | d28 | d31 | d66 | d69 | CRC | CRC |
| WDQ1 | d21 | d23 | d26 | d29 | d64 | d67 | d70 | d72 | CRC |
| WDQ2 | s0 | d24 | d27 | d30 | d65 | d68 | d71 | d73 | CRC |
| WDQ3 | s1 | d55 | d58 | d61 | d96 | d99 | d102 | CRC | CRC |
| WDQ4 | d53 | d56 | d59 | d62 | d97 | d100 | d103 | d105 | CRC |
| WDQ5 | d54 | d57 | d60 | d63 | d98 | d101 | d104 | d106 | CRC |

FRAME 2
UNIT INTERVAL

| | 18 | 19 | 20 | 21 | 22 | 23 | 24 | 25 | 26 |
|---|---|---|---|---|---|---|---|---|---|
| WDQ0 | WD=1 | d75 | d78 | d81 | d84 | d87 | d90 | CRC | CRC |
| WDQ1 | d74 | d76 | d79 | d82 | d85 | d88 | d91 | d93 | CRC |
| WDQ2 | s0 | d77 | d80 | d83 | d86 | d89 | d92 | d94 | CRC |
| WDQ3 | s1 | d108 | d111 | d114 | d117 | d120 | d123 | CRC | CRC |
| WDQ4 | d95 | d109 | d112 | d115 | d118 | d121 | d124 | d126 | CRC |
| WDQ5 | d107 | d110 | d113 | d116 | d119 | d122 | d125 | d127 | CRC |

FIG.5

FRAME 0
UNIT INTERVAL

|      | 0   | 1    | 2    | 3    | 4    | 5    | 6    | 7    | 8    |
|------|-----|------|------|------|------|------|------|------|------|
| RDQ0 | d64 | d68  | d72  | d76  | d80  | d84  | d88  | d92  | CRC8 |
| RDQ1 | d65 | d69  | d73  | d77  | d81  | d85  | d89  | d93  | CRC8 |
| RDQ2 | d66 | d70  | d74  | d78  | d82  | d86  | d90  | d94  | CRC8 |
| RDQ3 | d67 | d71  | d75  | d79  | d83  | d87  | d91  | d95  | CRC8 |
| RDQ4 | d96 | d100 | d104 | d108 | d112 | d116 | d120 | d124 | CRC8 |
| RDQ5 | d97 | d101 | d105 | d109 | d113 | d117 | d121 | d125 | CRC8 |
| RDQ6 | d98 | d102 | d106 | d110 | d114 | d118 | d122 | d126 | CRC8 |
| RDQ7 | d99 | d103 | d107 | d111 | d115 | d119 | d123 | d127 | CRC8 |

FRAME 1
UNIT INTERVAL

|      | 9   | 10  | 11  | 12  | 13  | 14  | 15  | 16  | 17   |
|------|-----|-----|-----|-----|-----|-----|-----|-----|------|
| RDQ0 | d0  | d4  | d8  | d12 | d16 | d20 | d24 | d28 | CRC8 |
| RDQ1 | d1  | d5  | d9  | d13 | d17 | d21 | d25 | d29 | CRC8 |
| RDQ2 | d2  | d6  | d10 | d14 | d18 | d22 | d26 | d30 | CRC8 |
| RDQ3 | d3  | d7  | d11 | d15 | d19 | d23 | d27 | d31 | CRC8 |
| RDQ4 | d32 | d36 | d40 | d44 | d48 | d52 | d56 | d60 | CRC8 |
| RDQ5 | d33 | d37 | d41 | d45 | d49 | d53 | d57 | d61 | CRC8 |
| RDQ6 | d34 | d38 | d42 | d46 | d50 | d54 | d58 | d62 | CRC8 |
| RDQ7 | d35 | d39 | d43 | d47 | d51 | d55 | d59 | d63 | CRC8 |

FIG.6

FRAME 0
UNIT INTERVAL

|      | 0  | 1  | 2   | 3   | 4   | 5   | 6   | 7   | 8    |
|------|----|----|-----|-----|-----|-----|-----|-----|------|
| RDQ0 | d0 | d4 | d8  | d12 | d16 | d20 | d24 | d28 | CRC8 |
| RDQ1 | d1 | d5 | d9  | d13 | d17 | d21 | d25 | d29 | CRC8 |
| RDQ2 | d2 | d6 | d10 | d14 | d18 | d22 | d26 | d30 | CRC8 |
| RDQ3 | d3 | d7 | d11 | d15 | d19 | d23 | d27 | d31 | CRC8 |

FRAME 1
UNIT INTERVAL

|      | 9   | 10  | 11  | 12  | 13  | 14  | 15  | 16  | 17   |
|------|-----|-----|-----|-----|-----|-----|-----|-----|------|
| RDQ0 | d64 | d68 | d72 | d76 | d80 | d84 | d88 | d92 | CRC8 |
| RDQ1 | d65 | d69 | d73 | d77 | d81 | d85 | d89 | d93 | CRC8 |
| RDQ2 | d66 | d70 | d74 | d78 | d82 | d86 | d90 | d94 | CRC8 |
| RDQ3 | d67 | d71 | d75 | d79 | d83 | d87 | d91 | d95 | CRC8 |

| READ FRAME 0 | READ FRAME 1 |
|--------------|--------------|
| QW0          | QW1          |

FIG.11

| | READ FRAME 0 | READ FRAME 1 |
|---|---|---|
| RPATH0 | QW0 | QW1 |
| RPATH1 | QW2 | QW3 |
| RPATH2 | QW4 | QW5 |
| RPATH3 | QW6 | QW7 |

FIG.12

| | READ FRAME 0 | READ FRAME 1 |
|---|---|---|
| RPATH0 | QW0 | QW4 |
| RPATH1 | QW1 | QW5 |
| RPATH2 | QW2 | QW6 |
| RPATH3 | QW3 | QW7 |

FRAME 0
UNIT INTERVAL

| | 0 | 1 | 2 | 3 | 4 | 5 | 6 | 7 | 8 |
|---|---|---|---|---|---|---|---|---|---|
| RDQ0 | d0 | d4 | d8 | d12 | d16 | d20 | d24 | d28 | CRC8 |
| RDQ1 | d1 | d5 | d9 | d13 | d17 | d21 | d25 | d29 | CRC8 |
| RDQ2 | d2 | d6 | d10 | d14 | d18 | d22 | d26 | d30 | CRC8 |
| RDQ3 | d3 | d7 | d11 | d15 | d19 | d23 | d27 | d31 | CRC8 |
| RDQ4 | d32 | d36 | d40 | d44 | d48 | d52 | d56 | d60 | CRC8 |
| RDQ5 | d33 | d37 | d41 | d45 | d49 | d53 | d57 | d61 | CRC8 |
| RDQ6 | d34 | d38 | d42 | d46 | d50 | d54 | d58 | d62 | CRC8 |
| RDQ7 | d35 | d39 | d43 | d47 | d51 | d55 | d59 | d63 | CRC8 |

FRAME 1
UNIT INTERVAL

| | 9 | 10 | 11 | 12 | 13 | 14 | 15 | 16 | 17 |
|---|---|---|---|---|---|---|---|---|---|
| RDQ0 | d256 | d264 | d272 | d280 | d288 | d296 | d304 | d312 | CRC8 |
| RDQ1 | d257 | d265 | d273 | d281 | d289 | d297 | d305 | d313 | CRC8 |
| RDQ2 | d258 | d266 | d274 | d282 | d290 | d298 | d306 | d314 | CRC8 |
| RDQ3 | d259 | d267 | d275 | d283 | d291 | d299 | d307 | d315 | CRC8 |
| RDQ4 | d260 | d268 | d276 | d284 | d292 | d300 | d308 | d316 | CRC8 |
| RDQ5 | d261 | d269 | d277 | d285 | d293 | d301 | d309 | d317 | CRC8 |
| RDQ6 | d262 | d270 | d278 | d286 | d294 | d302 | d310 | d318 | CRC8 |
| RDQ7 | d263 | d271 | d279 | d287 | d295 | d303 | d311 | d319 | CRC8 |

FIG.13

MEMORY TRANSFER WITH EARLY ACCESS TO CRITICAL PORTION

BACKGROUND

FIG. 1 illustrates a prior art memory system. A memory controller 10 and memory module 12 are connected by a memory channel 14 that provides signal lines for the transfer of data between the components. The system may include additional memory modules that may be connected to the controller through channel 14 or to the first module through another memory channel.

The memory controller 10, which may be an integral part of a processor, or part of a chipset 18 that supports a processor, controls the flow of memory data between the processor and memory devices 20 such as dynamic random access memory (DRAM) chips located on the module. In a conventional system, the memory channel 14 is implemented with a bi-directional data bus in which write data is sent to the module over the same signal lines that read data is returned to the controller. Data that is transferred across the channel is typically grouped into frames that include an actual data payload as well as check codes that enable the system to verify data integrity.

In some systems, a memory channel may utilize unidirectional links rather than a bi-directional bus. For example, a memory controller may be connected to a memory module by an outbound path having unidirectional bit lines that transfer information such as write data, address information, control signals, etc., to the module, and an inbound path having unidirectional bit lines that transfer information to the controller. If there is more than one memory module, the controller and modules may be arranged in a ring configuration in which each component may only transmit data in one direction to one other component.

BRIEF DESCRIPTION OF THE DRAWINGS

FIG. 4 illustrates an embodiment of a read data format according to some of the inventive principles of this patent disclosure.

FIG. 5 illustrates an embodiment of a write data format according to some of the inventive principles of this patent disclosure.

FIG. 6 illustrates another embodiment of a read data format according to some of the inventive principles of this patent disclosure.

FIG. 11 illustrates an embodiment of a memory mapping in a memory system according to some of the inventive principles of this patent disclosure.

FIG. 12 illustrates another embodiment of memory mapping in a memory system according to some of the inventive principles of this patent disclosure.

FIG. 13 illustrates an embodiment of a format for reading data across a read path according to some of the inventive principles of this patent disclosure.

DETAILED DESCRIPTION

Figure 1:
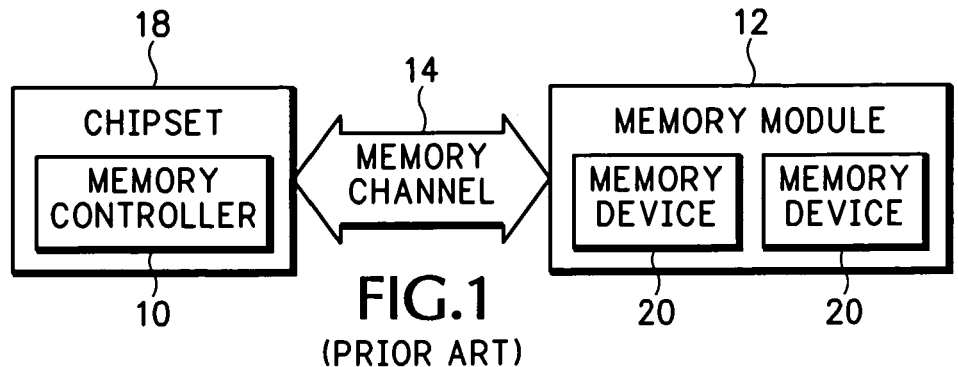
FIG. 1 illustrates a prior art memory system.
Figure 2:
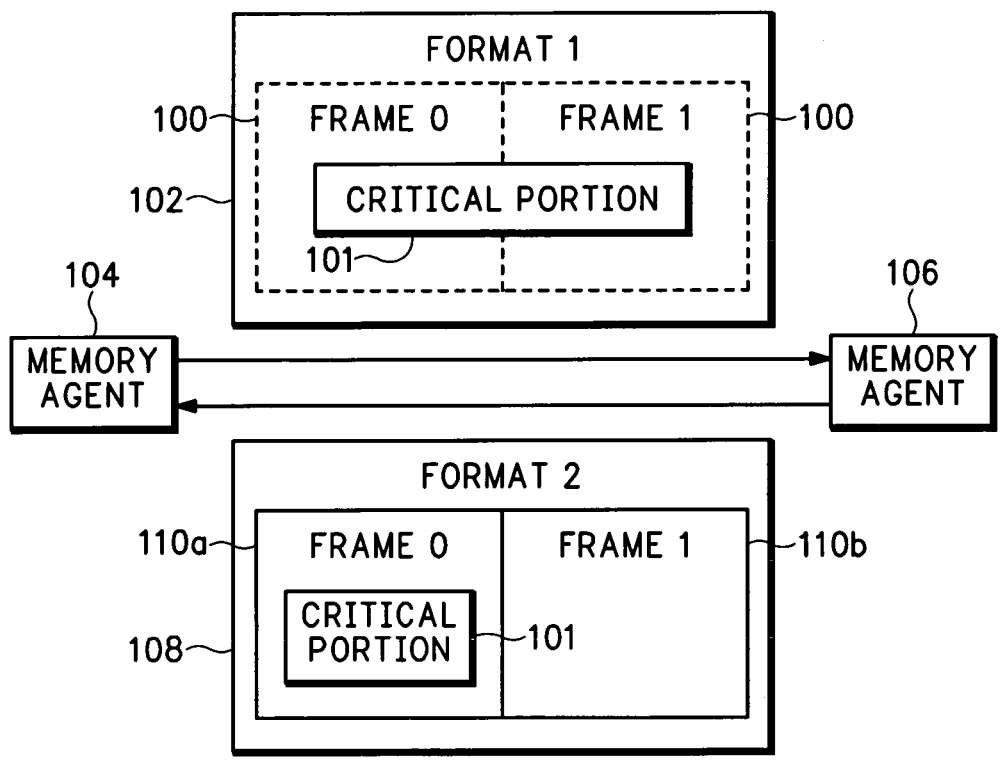
FIG. 2 illustrates an embodiment of a memory data transfer scheme according to some of the inventive principles of this patent disclosure.

FIG. 2 illustrates an embodiment of a memory data transfer scheme according to some of the inventive principles of this patent disclosure. In the embodiment of FIG. 2, data having a critical portion 101 is transferred from a first memory agent 104 to a second memory agent 106 in a first format that may include one or more frames 100. At least the critical portion of the data 101 is transferred back from the second memory agent 106 to the first memory agent 104 in a second format 108 that has at least two frames in which a first frame 110a is followed by a second frame 110b. The first frame 110a includes the critical portion 101. The first format 102 has a width that may be related to the amount of data that may be simultaneously transferred or the number of signal lanes that may be used in a data path from the first memory agent to the second memory agent. The width of the second format 108, which is different from the width of the first format, may be related to the amount of data that may be simultaneously transferred or the number of lanes that may be used in a data path back from the second memory agent to the first memory agent.

Figure 3:
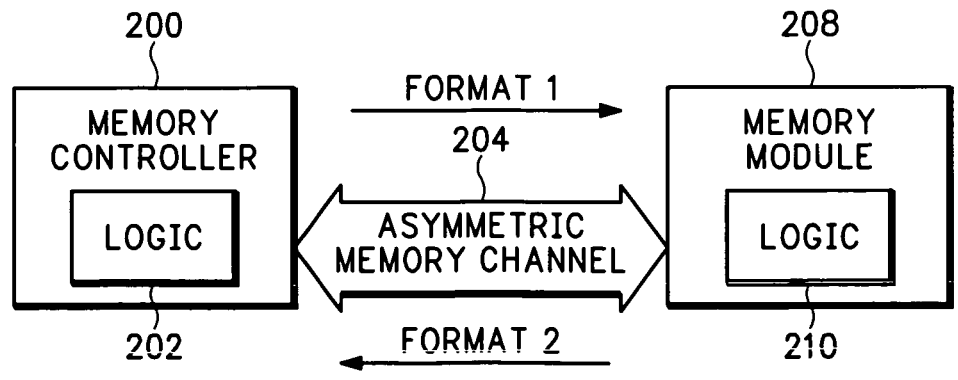
FIG. 3 illustrates an embodiment of a memory system according to some of the inventive principles of this patent disclosure.

FIG. 3 illustrates an embodiment of a memory system according to some of the inventive principles of this patent disclosure. A first memory agent 200 includes logic 202 to transfer data in a first format to a second memory agent 208 across an asymmetric channel 204, which may include, e.g., unidirectional and/or bidirectional lanes, and to receive at least a critical portion of the data in a second format back from the second memory agent across the channel. In this example, the first and second memory agents may be a memory controller and a memory module, respectively. In the asymmetric channel, the amount of data that may be transferred simultaneously in one direction is different than the amount of data that may be transferred simultaneously in the other direction. For example, the channel may include a path having a number of signal lanes in one direction and a different number of lanes in the other direction.

The first and second formats have widths that are related to the amount of data that may be transferred simultaneously in the respective directions. The first format may include any number of frames. The second format includes at least a first frame followed by a second frame, and the first frame includes the critical portion of the data. The critical portion of data is a portion of data that is required for the first memory agent, or a device requesting data through the agent, to perform an operation.

The second memory agent 208 includes logic 210 to receive data from the first memory agent 200 in the first format, and to transfer at least the critical portion of the data back to the first memory agent in a second format.

FIGS. 4 and 5 illustrate embodiments of read and write data formats, respectively, according to some of the inventive principles of this patent disclosure. The formats of FIGS. 4 and 5 may be used, for example, in a system having a memory controller connected to a memory module through a memory channel having a read return data path that is eight lanes wide (RDQ lanes 0-7), and a write data path that is six lanes wide (WDQ lanes 0-5). In this example, the memory module has at least one x8 memory device, that is, a memory device such as a dynamic random access memory (DRAM) that can output read data eight bits at a time. The read and write lanes are bitlines, i.e., may have binary values of 0 or 1. The read and write data formats both include 128 actual data bits (designated d0 through d127) and 16 check bits such as a cyclical redundancy check (CRC) code.

Referring to FIG. 4, the read data format is divided into two frames, each nine unit intervals (UI) long—eight UI of data and one UI of CRC. The lane on which each bit of data is transferred from the memory module to the memory controller is indicated along the left side of the table, while the numbers along the top of the table indicate the unit interval during which each bit is transferred. Thus, the format has a width of eight bits to match the width of the read data path (RDQ0-7), and a length of 18 UI.

A memory read operation begins at the start of the first frame (FRAME 0) when data bits d0-d3 and d32-d35 are transferred from the x8 memory device over lanes RDQ0-3 and RDQ4-7, respectively, during the first unit interval UI0. During the next unit interval UI1, bits d4-d7 and d36-d39 are transferred over lanes RDQ0-3 and RDQ4-7, respectively. The data transfer continues for six more UI at which point data bits d0-d63 have been transferred. During the next unit interval (UI8), an 8-bit CRC code is transferred, thus completing the first frame. The second frame (FRAME 1), which includes data bits d64-d127 and another 8-bit CRC code are then transferred during unit intervals UI9-UI17.

In the example of FIG. 4, the first 64 bits (d0-d63) may be designated as a critical portion of data, and thus, the memory controller may gain early access to the critical portion which is all included in the first frame. Alternatively, data bits (d64-d127) may be designated as the critical portion and transferred during the first frame as shown in FIG. 6. A critical portion, however, is not limited to any particular size or configuration within the format, and for example, need not occupy an entire frame.

To support the read data format illustrated in FIG. 4, the write data format shown in FIG. 5 may be used. The format of FIG. 5 is six bits wide to match the width of the write data path WDQ0-5. To accommodate the entire 128 bits of data on the narrower write path, the write format has a length of 27 unit intervals (UI0-26) and is divided into three frames (FRAME 0-2). In this example, the x8 memory device, which can output read data eight bits at a time, has a 6-bit input port. In the embodiment of FIG. 5, data bits d0-d20 and d32-d52 are included in FRAME 0, data bits d21-d31, d53-d73, and d96-106 are included in FRAME 1, and data bits d74-d95 and d107-d127 are included in FRAME 2. Eight CRC bits are arranged at the end of each frame. The first frame (FRAME 0) may also be designated as a header frame. Each frame may also include other bits such as WD which may indicate a write data frame (as opposed to a status or command frame), and S0,S1 which may be used to select a rank if the system includes multiple memory ranks.

A write operation begins with the first six bits being transferred over lanes WDQ0-5 during the first unit interval UI0. The transfers continue until all three frames are completed at unit interval UI26. Logic on the memory module or in a memory device may process the data so that it is written to and read from an x8 memory device in an appropriate arrangement so that the critical portion is included in the first frame of a read operation. As described above, an indicator such as a column address bit may indicate which portion of the data is critical.

In another example embodiment, a memory system according to some of the inventive principles of this patent disclosure may utilize x4 memory devices that can output read data four bits at a time. For example, two x4 memory devices may be addressed as a virtual x8 device. In the two x4 configuration, copies of the same 6-lane write data path may be connected to both x4 memory devices which receive the same commands and the same write data as an x8 device. However, each of the x4 devices may store only half of the write data.

Figures 7, 8:
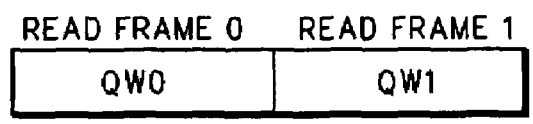
FIG. 7 illustrates another embodiment of a read data format according to some of the inventive principles of this patent disclosure.
FIG. 8 illustrates an embodiment of a data mapping arrangement according to some of the inventive principles of this patent disclosure.

FIG. 7 illustrates an embodiment of a read data format for an x4 memory device according to some of the inventive principles of this patent disclosure. In this embodiment, the x4 memory device transfers data bits d0-d31 in a first frame, and d64-d95 in a second frame. Depending on the size of a critical portion of data and the arrangement of the devices, it may be necessary to obtain the output from another x4 device (having d32-d63 and d96-d127) to access the critical portion in one frame.

In the example embodiments described above with reference to FIGS. 4-7, 128 bits of data are remapped over asymmetric read and write paths in the context of a single x8 or two x4 memory devices. This may alternatively be described as returning two quad words or "QWords" of 64 bits each over two frames as illustrated in FIG. 8.

Figure 9:
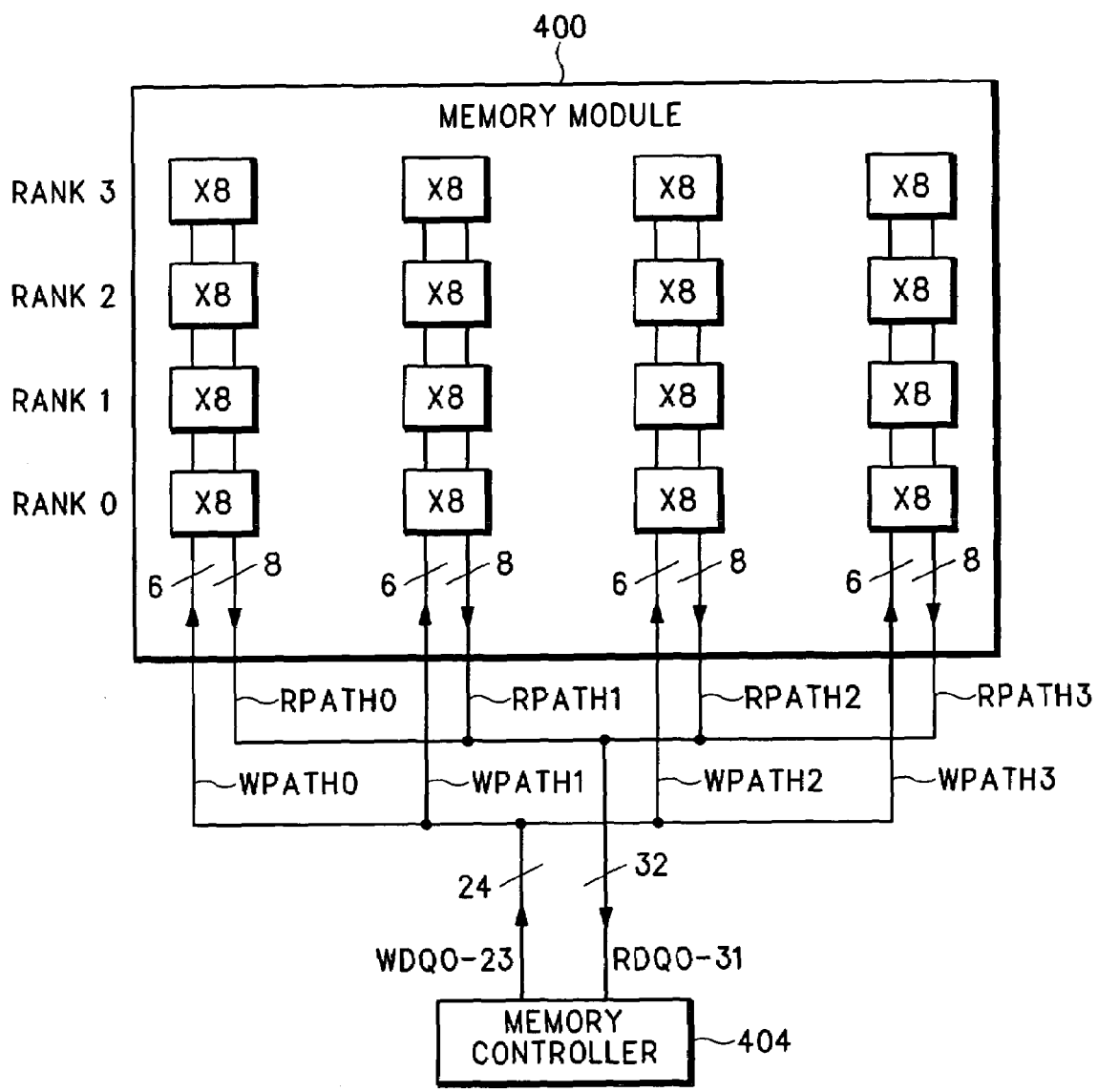
FIG. 9 illustrates an embodiment of a multi-rank data mapping arrangement according to some of the inventive principles of this patent disclosure.
Figure 10:
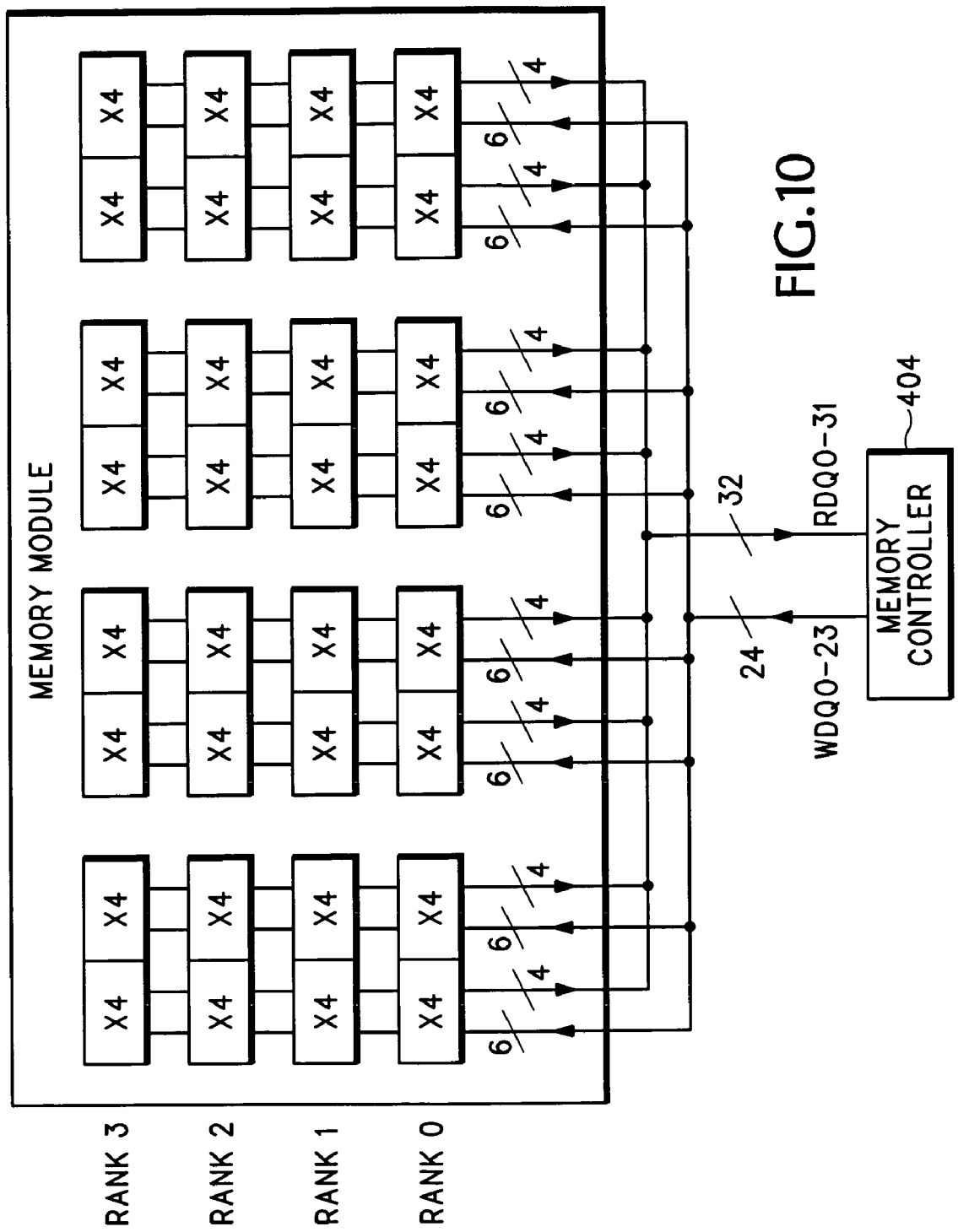
FIG. 10 illustrates another embodiment of a multi-rank data mapping arrangement according to some of the inventive principles of this patent disclosure.

Some of the inventive principles of this patent disclosure also contemplate systems that include multiple ranks of memory devices. For example, FIGS. 9 and 10 illustrate embodiments of memory systems in which a memory module 400 has four ranks (RANK 0-3) of memory devices. Each rank may have four x8 devices as shown in FIG. 9 or eight x4 devices as shown in FIG. 10. Each memory device in a rank is connected to the controller through one of the 8-lane read paths RPATH 0-3. In the case of x4 devices, two devices may share an 8-lane read path.

In this example, the memory controller 404 is for a chipset that supports a processor that operates on a cacheline of 512 bits or eight QWords. A cacheline may be mapped across an entire rank of memory devices as shown in FIG. 11. The mapping may be further optimized to read QWords 0-3 first as shown in FIG. 12.

FIG. 13 illustrates an embodiment of a format for reading data across RPATH 0 that may support the optimized memory access of FIG. 12. In the example of FIG. 12, QWord 0 (data bits d0-d63) and QWord 4 (data bits d256-d319) are shown in FRAME 0 and FRAME 1, respectively. Likewise, QWords 1 and 5, QWords 2 and 6, and QWords 3 and 7 may be transferred in a similar format over RPATH 1-3, respectively.

The embodiments described herein may be modified in arrangement and detail without departing from the inventive principles. For example, embodiments have been described having specific numbers of modules, memory devices, ranks, signal lanes, numbers of bits per memory device (x4, x8), etc., but the inventive principles are not so limited. For example systems using x2, x16, etc. memory devices are contemplated. Likewise, logic may be implemented in hardware, software, or a combination of both. Specific data formats have been shown as examples, but the inventive principles are not limited to these formats. As a further example, memory modules and memory controllers may be implemented as separate components, or they may be fabricated on a common printed circuit board. Some devices may be on a mother board, while others are on one or more modules. There may be any number of ranks, and the memory devices in a rank may be on a single module, spread out over multiple modules, spread between modules and a mother board, etc. A lane may include one or more conductors whether differential or single-ended, etc. A memory controller in a system according to some of the inventive principles of this patent disclosure may be an independent component, and/or it may be part of a processor, part of a chipset, etc. As yet another example, some of the embodiments describe memory read operations from a memory module to a memory controller, but some of the inventive principles may also be applied to module-to-module transfers and other configurations. Accordingly, such variations are considered to fall within the scope of the following claims.

The invention claimed is:

1. A method comprising:
transferring data from a first memory agent to a second memory agent in a first format having a first width; and
transferring at least a critical portion of the data from the second memory agent back to the first memory agent in a second format having a second width different from the first width and including a first frame followed by a second frame;
where the first frame includes the critical portion of the data.

2. The method of claim 1 where the first format includes two or more frames.

3. The method of claim 1 where the critical portion includes a cacheline.

4. The method of claim 1 where the critical portion is mapped over a memory device rank.

5. The method of claim 4 where:
the rank includes one or more memory devices; and
the critical portion is mapped over substantially the entire rank of memory devices.

6. The method of claim 1 where the first memory agent comprises a memory controller.

7. The method of claim 1 where the first memory agent comprises a memory module.

8. The method of claim 1 where the second memory agent comprises a memory module.

9. The method of claim 1 where data is transferred over a memory channel having bidirectional links.

10. The method of claim 1 where data is transferred over a memory channel having unidirectional links.

11. A memory agent comprising:
logic to transfer data to a second memory agent in a first format having a first width; and
logic to receive at least a critical portion of the data from the second memory agent in a second format having a second width different from the first width and including a first frame followed by a second frame;
where the first frame includes the critical portion of the data.

12. The memory agent of claim 11 where the first format includes two or more frames.

13. The memory agent of claim 11 where the critical portion includes a cacheline.

14. The memory agent of claim 1 where the memory agent comprises a memory controller.

15. The memory agent of claim 1 where the memory agent comprises a memory module.

16. A memory agent comprising:
logic circuitry to receive data from a second memory agent in a first format having a first width; and
logic circuitry to transfer at least a critical portion of the data to the second memory agent in a second format having a second width different from the first width and including a first frame followed by a second frame;
where the first frame includes the critical portion of the data.

17. The memory agent of claim 16 further including a memory device rank.

18. The memory agent of claim 17 where the critical portion is mapped over the memory device rank.

19. The memory agent of claim 18 where:
the rank includes two or more memory devices; and
the critical portion is mapped over substantially the entire rank of memory devices.

20. The memory agent of claim 16 where the memory agent comprises a memory module.

21. A memory system comprising:
a first memory agent; and
a second memory agent coupled to the first memory agent by an asymmetric memory channel;
where the first memory agent comprises logic to:
transfer data from the first memory agent to the second memory agent in a first format having a first width, and
transfer at least a critical portion of the data from the second memory agent back to the first memory agent in a second format having a second width different from the first width and including a first frame followed by a second frame,
where the first frame includes the critical portion of the data.

22. The system of claim 21 where the critical portion includes a cacheline.

23. The system of claim 21 where the critical portion is mapped over a memory device rank.

24. The system of claim 23 where:
the rank includes two or more memory devices; and
the critical portion is mapped over substantially the entire rank of memory devices.

25. The system of claim 21 where the first memory agent comprises a memory controller.

26. The system of claim 21 where the second memory agent comprises a memory module.

* * * * *